United States Patent [19]
Baloche et al.

[11] Patent Number: 5,820,218
[45] Date of Patent: Oct. 13, 1998

[54] HINGES FOR THE BACKS OF VEHICLE SEATS

[75] Inventors: François Baloche; Christian Couasnon, both of Flers, France

[73] Assignee: Bertrand Faure Equipements S.A., France

[21] Appl. No.: 537,595

[22] Filed: Oct. 2, 1995

[30] Foreign Application Priority Data

Oct. 3, 1994 [FR] France ................................... 94 11788

[51] Int. Cl.$^6$ ....................................................... B60N 2/02
[52] U.S. Cl. ................ 297/367; 297/378.12; 297/354.12
[58] Field of Search ............................ 297/301.7, 354.12, 297/361.1, 366, 367, 378.12

[56] References Cited

U.S. PATENT DOCUMENTS

| | | | |
|---|---|---|---|
| 3,051,526 | 8/1962 | Werner et al. | 297/367 |
| 3,953,069 | 4/1976 | Tamura . | |
| 4,348,050 | 9/1982 | Letounoux et al. | 297/367 X |
| 4,538,856 | 9/1985 | Katsumoto et al. | 297/367 |
| 4,615,551 | 10/1986 | Kinaga et al. . | |
| 4,995,669 | 2/1991 | Croft . | |
| 5,340,196 | 8/1994 | Ikegaya et al. | 297/367 |

FOREIGN PATENT DOCUMENTS

| | | | |
|---|---|---|---|
| 0082418 | 12/1982 | European Pat. Off. . | |
| 3319593 | 6/1982 | Germany . | |
| 5038306 | 2/1993 | Japan | 297/367 |

Primary Examiner—Laurie K. Cranmer
Attorney, Agent, or Firm—Larson & Taylor

[57] ABSTRACT

A hinge for the back of a vehicle front seat comprises two fine adjustment mechanisms A and B having respective central cams and toothed slugs 7A and 7B, the mechanisms being disposed on either side of the seat and being controllable by a common handle 8, the hinge also has a single locking mechanism C with a latch that is controllable by a knob M, the locking mechanism being situated on the same side as the handle and allowing the back to be tilted down forwards. The cams are controlled by two colinear lengths of shaft 6A and 6B that are free to move angularly relative to each other and the first of which is connected to the handle. These lengths are respectively connected to two levers 17 and 18–19 that bear angularly against each other, the lever 18 which is not connected to the handle being connected by a cable 20 to the latch in such a manner that the mechanism B that is further from the handle is controlled both by the handle and by the knob.

5 Claims, 3 Drawing Sheets

HINGES FOR THE BACKS OF VEHICLE SEATS

The invention relates to hinge devices for the back of a vehicle front seat making it possible firstly to adjust inclination finely for normal sitting positions, and secondly to tilt the back down forwards with the possibility of subsequently returning it to its pre adjusted angular position, in particular for the purpose of improving accessibility to the backseats of the vehicle concerned.

Among such hinge devices, the invention relates more particularly to those which comprise:

on at least one side of the seat, an angular locking mechanism for locking the back and comprising a moving latch, a base suitable for being secured to the seat proper and having a notch for receiving the latch, and a return spring for continuously urging the latch towards the notch;

a control member referred to below as a "knob" mounted on the back and suitable for causing the latch to be disengaged from its notch against the return force of the corresponding return spring;

on both sides of the seat, a respective adjustment mechanism for discontinuous adjustment of the inclination of the back, each mechanism comprising a cheekplate connected to the seat proper and provided with a ring guiding one or more slugs, a cheekplate provided with an internally toothed ring, which cheekplate is secured to the base of the locking mechanism situated on the same side of the seat, a cam mounted to rotate about the common axis of the two rings, at least one toothed slug mounted so as to be capable of sliding radially in the cheekplate connected to the seat proper and suitable for co-operating with the cam and with the toothed ring, and a return spring urging the cam towards its angular locking position; and a rotary control member referred to below as a "handle", that is easily actuated by a user sitting on the seat and that is suitable for causing the cams of both adjustment mechanisms to rotate simultaneously.

In known embodiments of such hinges:

an angular locking mechanism with its own latch and notch is provided on either side of the seat;

the two cams of the adjustment mechanisms are permanently interconnected with respect to rotation by a transverse shaft.

With such hinges, it is possible to release the back angularly relative to the seat proper:

either by actuating the knob for the purpose of tilting the back forwards, thereby simultaneously disengaging the two latches from their notches and angularly releasing the mount s of the corresponding bases;

or else, by actuating the handle for fine or "comfort" adjustment of the inclination of the back, thereby radially releasing the toothed slugs in each of the two adjustment mechanisms from the corresponding toothed rings by displacing the slugs towards the axis of the rings, and thus causing each cheekplate associated with the back to be angularly released relative to the cheekplate associated with the seat proper.

The above hinges give entire satisfaction so long as the two types of angular release mentioned above are implemented separately.

If they are implemented simultaneously, i.e. if both the knob and the handle are actuated together, each intermediate assembly constituted by a base and the back cheekplate secured thereto is released angularly relative both to the seat proper and to the back: the assembly is then mounted loose between those two components of the seat.

Under such conditions and because of local differences in friction, it is possible for one of the two intermediate assemblies to be displaced angularly relative to the other.

When the two control members are subsequently released, return of the toothed slugs to their meshing positions ensures that each back cheekplate is again angularly secured relative to the corresponding seat proper cheekplate.

However, under the circumstances mentioned above where one of the two intermediate assemblies has been angularly offset relative to the other, angular connection between the mount and the base is achieved only for that one of the two assemblies for which the notch was the first to come into alignment with the corresponding latch during return of the back to its initial preadjusted position.

The complete chain ensuring connection between the seat and the back is then reestablished on the side of the seat which includes said assembly, but it is not reestablished on the other side, where the base-mount link is missing.

In other words, the strength of the angular connection between the seat proper and the back is then greatly reduced and is indeed substantially divided by two.

The main object of the invention is to remedy this drawback.

To this end, according to the invention, a hinge device of the above kind is essentially characterized in that there is only one angular locking mechanism and in that the shaft connecting together the cams of the two adjustment mechanisms is made up of two colinear lengths that are capable of moving angularly relative to each other, these two lengths being secured to the two respective cams and to two radial levers suitable for bearing angularly against each other in one direction only, and comprising a first lever secured to the length that is on the same side as the locking mechanism, and a second lever that is secured to the other length, an off-center point on the second lever being connected to the latch of the locking mechanism by a cable, the assembly being organized in such a manner that:

actuating the handle in the direction for unlocking the adjustment mechanism whose cam is secured to the handle has the effect of also unlocking the other adjustment mechanism by angular thrust of the first lever against the second lever, return of the handle to its original position giving rise automatically to return of both mechanisms to their locking positions because of the resilient return means associated with the cams of the two mechanisms; and actuating the knob in the direction for disengaging the latch from its notch has the effect of causing the second lever to rotate in the same direction as before, corresponding to unlocking the second adjustment mechanism, release of the knob giving rise to resilient return of the latch into its notch as soon as the angular positions of the latch and of the notch coincide again, and by the second adjustment mechanism returning to its locking position because of the resilient angular return of the cam in said mechanism to its initial position.

In preferred embodiments, use is also made of one or more of the following dispositions:

the two lengths making up the control shaft of the two adjustment mechanisms comprise respective endpieces engaged one in the other in such a manner as to allow mutual angular sliding;

the connection zone between the two component lengths of the control shaft of the two adjustment mechanisms is axially disposed in the immediate vicinity of the adjustment mechanism whose cam is secured to the handle;

the first lever is constituted by a plate that tapers towards its end further from the axis of the shaft like a hand of a clock, and the second lever is likewise constituted by an elongate plate extending diametrically on either side of the axis, which plate has one end connected to the cable and its other end extended by a tab extending at 90° thereto and suitable for coming into angular abutment against the first lever; and the cable is connected to the second lever via a spring.

Apart from the above main dispositions, the invention includes certain other dispositions which are preferably used simultaneously therewith and which are described in greater detail below.

There follows a description of two preferred embodiments of the invention given with reference to the accompanying drawings, and naturally given in non-limiting manner.

FIG. 1 of the drawings is a partially cutaway general plan view of a hinge device in accordance with the invention.

Figure 1:
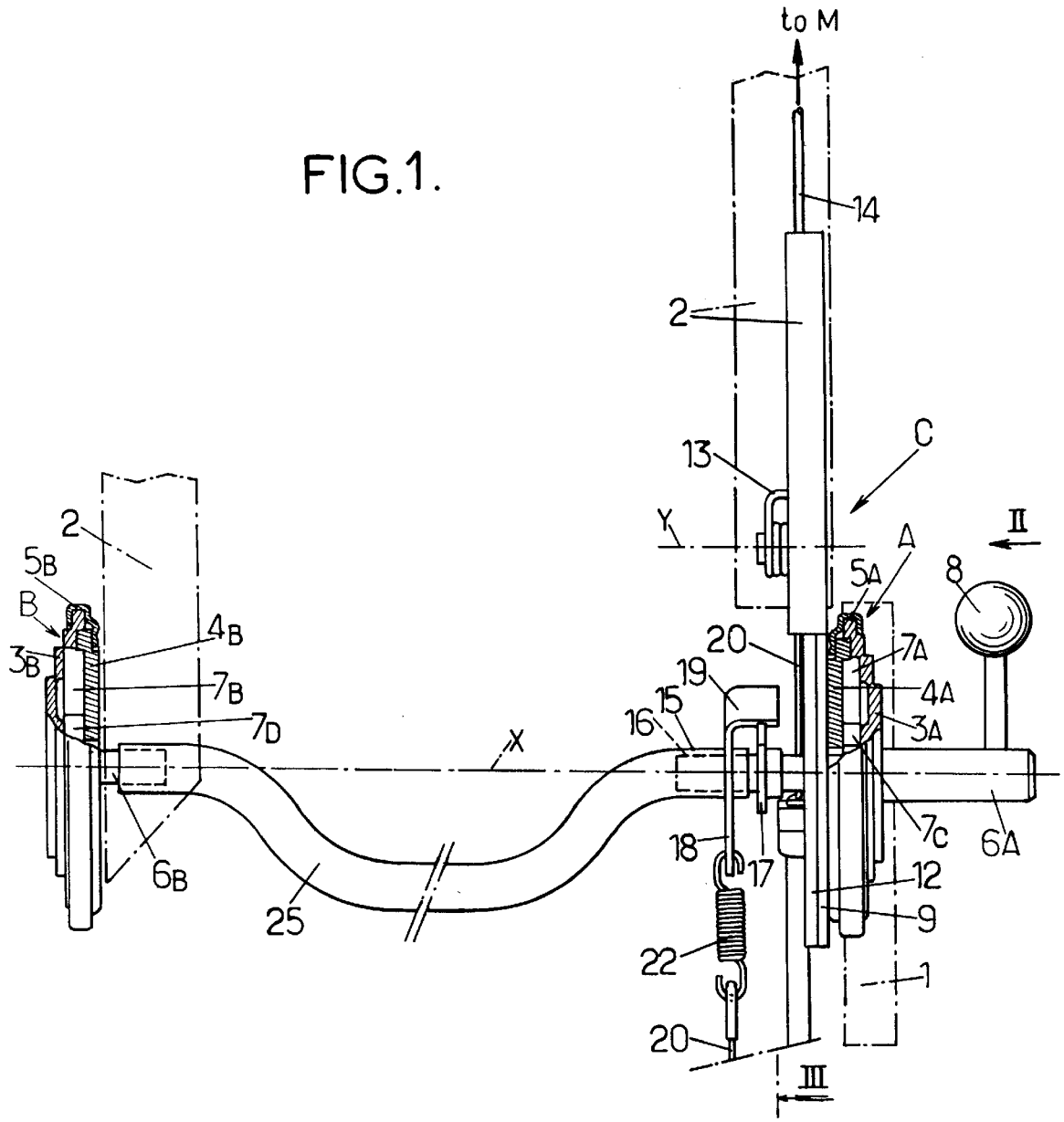

In general terms, the idea is to mount a seat back 2 so that it can pivot about a horizontal axis X associated with the fixed seat proper 1 of a vehicle front seat, in such a manner that:

firstly, inclinations of the back in normal sitting positions are adjustable over an angular range; and secondly, the back can be easily tilted down forwards so as to give access to the backseats of the vehicle, with it being possible subsequently to return it to its pre adjusted inclination, which is particularly useful in vehicles that have only one door on either side.

To this end, and in conventional manner, the hinge device comprises two adjustment mechanisms A and B for discontinuous adjustment of inclination, which mechanisms are disposed on respective sides of the seat, together with a single locking mechanism C mounted on one of the uprights of the seat back, assumed in the present case and by way of example to be the side adjacent to the vehicle door that provides backseat access.

Each of these adjustment mechanisms A and B comprises:

a respective seat cheekplate 3A, 3B associated with the seat proper 1; and a respective back cheekplate 4A, 4B secured directly or otherwise as described below to the framework of the back 2, each seat cheekplate co-operating with the corresponding back cheekplate and with an appropriate crimping ring 5A, 5B to form a circular housing with it being possible for the back cheekplate to slide snugly in guided rotation relative to the seat cheekplate.

Two internally indexed rings whose axes coincide with the axis X are provided in each housing, each indexed ring being associated with a respective one of the two cheekplates making up the housing.

Each housing contains a cam 7C, 7D mounted to rotate about the axis X and secured to a length of shaft 6A or 6B passing right through the housing.

Toothed pegs or slugs 7A, 7B are mounted to slide radially in guides formed in each seat cheekplate, with sliding thereof being controlled by the cams. Said slugs are preferably three in number, being angularly offset at 120° intervals around the axis X. The teeth of the slugs are suitable for co-operating with the toothed ring of one of the two cheekplates so that when said slugs are in their positions radially furthest from the axis X, their meshing with the two rings locks them angularly together, whereas otherwise, when they are in their positions closest to the axis, the facing sets of teeth are far enough apart to allow the two cheekplates to move angularly relative to each other.

The shaft 6A is secured to a handle 8 which is easily accessible to a user of the seat in the sitting position on the seat.

In addition, at least one spring is provided for constantly urging the cam of each mechanism together with the members secured thereto towards an angular rest position which corresponds to the toothed slugs meshing in the facing rings, i.e. the hinge is locked.

In a manner that is likewise known, one of the cheekplates 4A is not permanently secured to the framework of the back 2.

This cheekplate 4A is secured to a base 9 having a notch 10 formed therein (FIG. 2) and suitable for releasably receiving a latch 11 itself carried by a mount 12 secured to said framework of the back 2.

The latch 11 is advantageously constituted by the tip of a hook mounted to pivot about an axis Y that is secured to the framework of the back and parallel to the axis X, the hook being urged angularly by a torsion spring 13 in the direction corresponding to its engagement in the notch 10.

A rod 14 connects the hook 11 to a small control knob (not shown but symbolized by reference M) mounted on the back 2 near the top of its flank situated on the same side as the corresponding access door.

In known embodiments of hinges implementing the above-described dispositions:

the two shafts 6A and 6B secured respectively to the cams of the two adjustment mechanisms A and B are themselves permanently united in such a manner as to enable the handle 8 to control simultaneous unlocking of both mechanisms; and on both sides of the seat there is to be found an assembly comprising a base 9 and a mount 12 comprising a hook 11 resiliently urged towards a notch 10, and the hooks of both locking mechanisms are both actuated from the same control knob M.

With such hinges, the back can be released angularly:

firstly, by rotating the handle 8 so as to make fine or "comfort" adjustments of the inclination of the back possible in either of its sitting positions; and secondly, by actuating the knob M to enable the back to be tilted down forwards in order to facilitate access to the backseats, with it being possible for the back subsequently to return automatically to its preadjusted comfort inclination.

As explained above, with those known embodiments, there exists a risk: if the back is doubly released by acting simultaneously on the handle 8 and on the knob M, then the intermediate equipment constituted on either side of the back by a cheekplate 4A, 4B connected to the back and by the corresponding base 9 of the back is angularly released both relative to the associated cheekplate 3A, 3B connected to the seat proper and relative to the framework of the back 2.

The intermediate equipment on both sides is thus loose and it is quite possible for the equipment on one side to become angularly offset relative to the equipment on the other side during subsequent maneuvers, thereby giving rise to a mutual angular offset between the two latch-receiving notches.

Subsequent locking then causes only one of the two latches to engage, namely the first latch to find itself facing the corresponding notch when the back is moving towards its normal position, and as a result the back is not properly secured angularly relative to the seat, since it is secured thereto on one side only.

This drawback is eliminated by the measures described below.

Firstly, only one locking mechanism C comprising a latch and a notch is provided in this case and it is located on the side of the back which is closer to the corresponding access door of the vehicle. Naturally, it could be disposed on the other side of the back.

Secondly, the two shafts 6A and 6B respectively secured to the actuating cams of the two adjustment mechanisms A and B are no longer secured to each other: they remain colinear but they are mounted so as to be capable of being moved angularly independently of each other.

Figure 2:
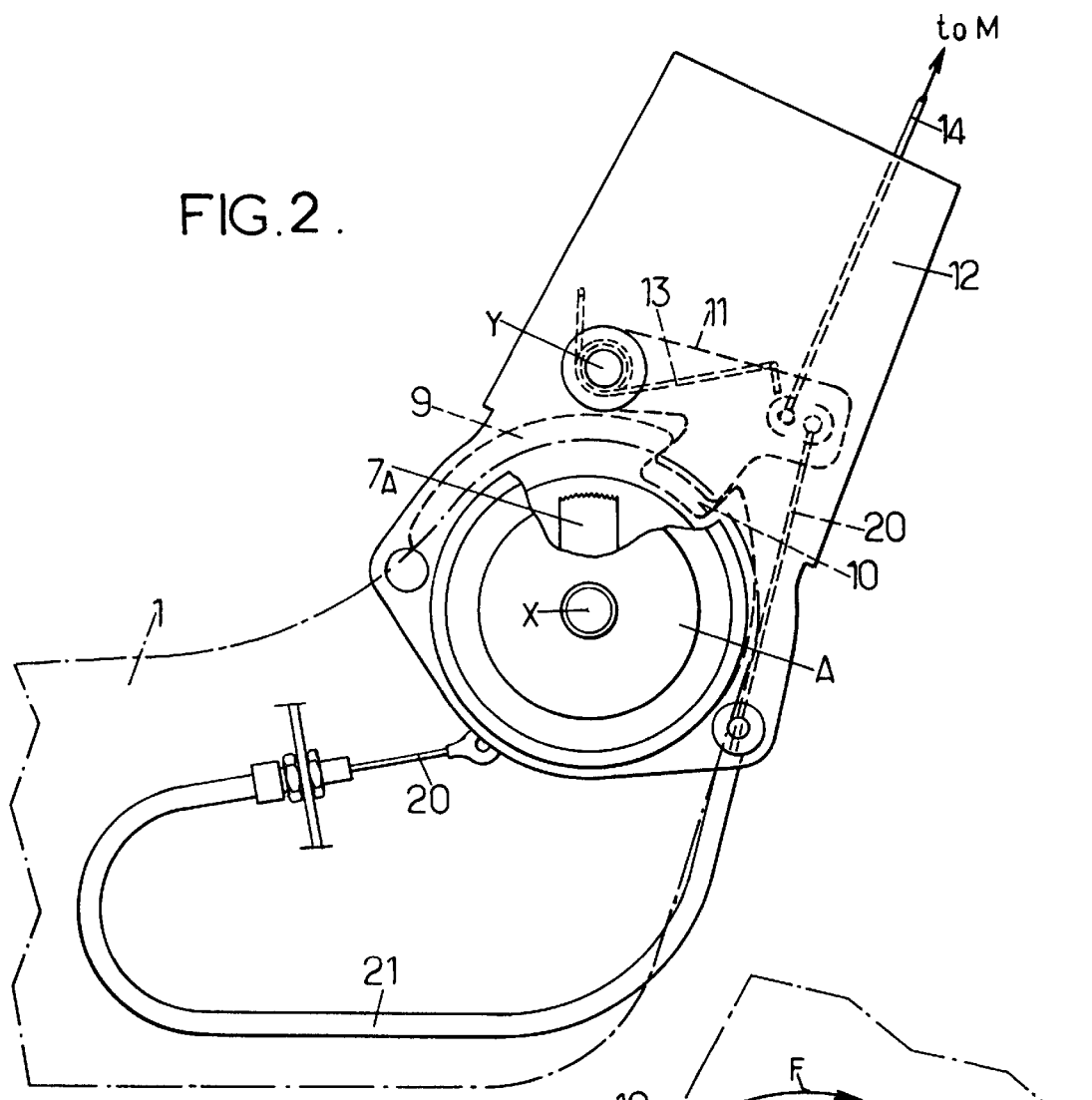
FIG. 2 is a side view of the same device as seen along arrow II in FIG. 1.
Figure 3:
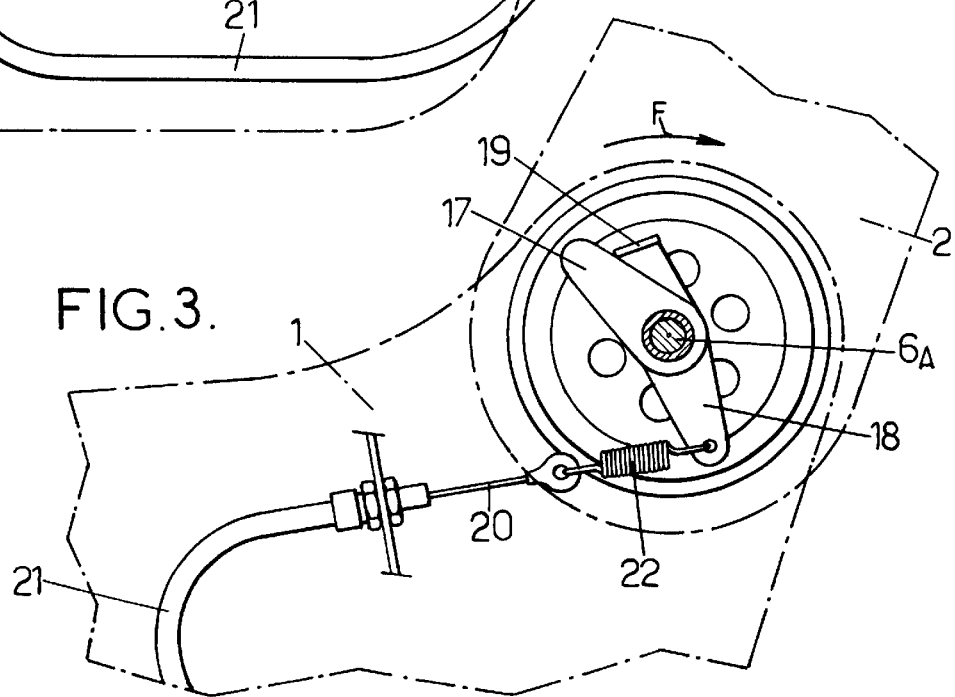
FIG. 3 is a fragmentary section of said device as seen along arrow III of FIG. 1.

In the first embodiment shown in FIGS. 1 to 3, one of the two shafts, the shaft 6B, has a tubular endpiece 15 on the axis X that is engaged in angularly slidable manner on a cylindrical finger 16 terminating the shaft 6A.

In addition:

the shaft 6A is secured to a first lever 17; and the tubular endpiece 15 is secured to a second lever 18 suitable for bearing angularly against the lever 17 in only one direction of rotation about the axis X.

In the embodiment shown, the first lever 17 is constituted by a radially elongate plate that tapers towards its end remote from the axis like a hand of a clock, and the second lever 18 is likewise an elongate plate extending on either side of the axis X and including at one of its ends a tab 19 folded out through 90° and suitable for coming into angular abutment against the free end of the first lever 17.

The end of the second lever 18 furthest from the folded-out tab 19 is connected to the end of the hook 11 by an inextensible cable 20 that is housed over the major part of its length in a sheath 21 whose ends are fixed respectively to the framework of the seat proper 1 and to the framework of the back 2.

The respective angular positions of the two levers 17 and 18 about the axis X are selected in such a manner that, at rest, the two levers are angularly in contact with each other and rotation of the handle 8 in the direction corresponding to releasing the adjustment mechanism A has the effect of causing the second lever 18 to be pushed back without play by the first lever 17, thereby driving the shaft 6B in the direction (arrow F in FIG. 3) corresponding to unlocking the adjustment mechanism B.

The cable 20 is fastened in such a manner that disengagement of the hook 11 from its notch 10 also has the effect of displacing the second lever 18 in the direction of arrow F, which corresponds to unlocking the adjustment mechanism B.

In FIGS. 1 and 3, there can also be seen a small spring 22 between the lever 18 and the cable 20 for taking up the angular curve difference between the levers 11 and 18.

The hinge device described above operates as follows.

To release the back angularly for fine or "comfort" adjustment of its inclination, it suffices to actuate the handle 8 in the direction for unlocking the adjustment mechanism A: this actuation has the effect of simultaneously unlocking the adjustment mechanism B because the shaft 6B is driven from the shaft 6A by direct contact of the lever 17 against the lever 18.

This angular release of the back is used by the user of the seat to adjust the inclination of the back merely by the user leaning into the back against the opposing force of a strong return spring.

When the handle 8 subsequently returns to its initial position, the resilient returns of the springs associated with the cams of the two mechanisms ensure that the teeth of the slugs in the two mechanisms mesh again with the corresponding facing toothed rings, thereby ensuring that both of these two mechanisms are again locked for the new adjusted inclination of the back.

If it is desired to tilt the back 2 down forwards, it suffices to act on the knob M which has two effects:

the hook 11 is disengaged from the notch 10; and the adjustment mechanism B is unlocked because its shaft 6B is rotated by the traction exerted by the cable 20 on the second lever 18.

The back 2 can thus be tilted down forwards.

Subsequent return of the knob M to its initial rest position causes the hook 11 to be reinserted resiliently into its notch 10 during angular return of the back as soon as said hook is again in the same angular position as said notch.

The slack given to the cable 20 as a result of the new insertion makes it possible for the cam of the mechanism B to return resiliently to its initial position, thereby ensuring that the back is angularly secured on both sides thereof.

Finally, if the handle 8 and the knob M are actuated simultaneously, then all three mechanisms A, B, and C are observed to unlock simultaneously, and during the subsequent returns of those two members 8 and M to their initial positions, all three mechanisms are observed to lock again in exactly the manner described above.

In particular, the new locking engagement due to the knob M returning to its rest position necessarily requires the hook 11 to be reinserted into its notch 10, and it is that reinsertion which in turn causes adjustment mechanism B to be locked again.

The risk of observing total absence of meshing or of locking on one of the two sides of the seat no longer exists since reliance is no longer made on a second hook of the same type as the hook 11 being reinserted in a corresponding notch, which notch could inadvertently have become angularly offset relative to the above notch 10.

Consequently, in all cases, secure angular fixing is observed of both sides of the back 2 relative to the seat 1 when the two control members 8 and M return to their rest positions, even if both members should happen to be actuated simultaneously.

This observation may also be expressed as follows:

the adjustment mechanism B further away from the handle 8 is controlled not only each time the handle 8 is actuated, but also each time the knob M is actuated, and this applies equally well in the unlocking direction and in the consecutive relocking direction: it is thus certain that the mechanism B is again locked at the end of any actuation of one or other of the two members, even if both of them should happen to be actuated simultaneously; and since each of the mechanisms A and C disposed on the same side as the handle is properly relocked at the end of actuation of the associated control member 8 or M, the back is likewise mechanically secured to the seat in all cases on the same side of the back as the handle.

In the embodiment described with reference to FIGS. 1 to 3, the mutual engagement of the two shafts 6A and 6B as provided by the endpiece 15 and the finger 16, and also the corresponding pair of levers 17 and 18 are situated axially in the immediate vicinity of the adjustment mechanism A close to the handle 8.

Figure 4:
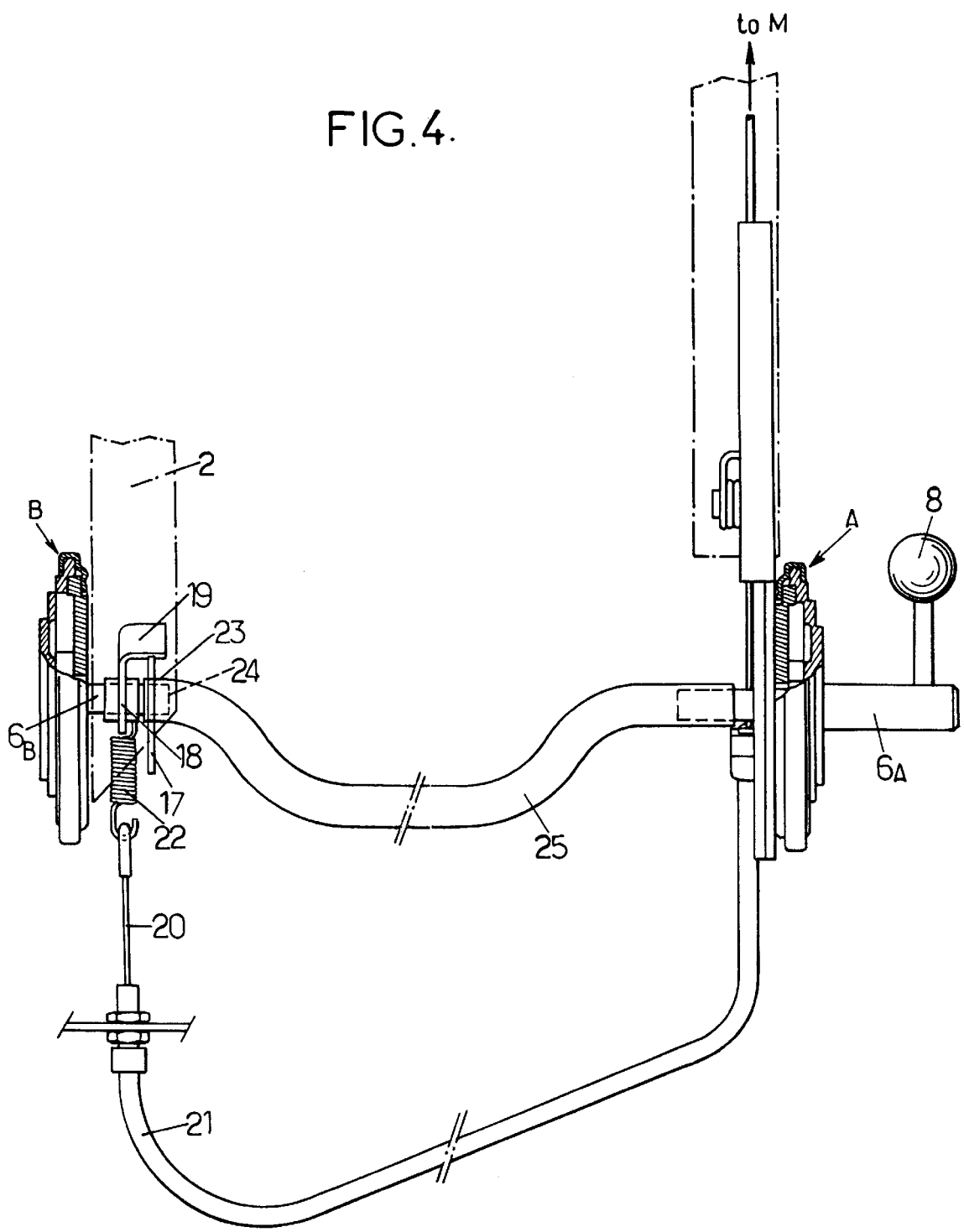
FIG. 4 is similar to FIG. 1 and shows a variant hinge device also in accordance with the invention.

In a variant shown in FIG. 4, the engagement 15, 16 and the levers 17, 18 are disposed in the immediate proximity of the other adjustment mechanism B.

In this variant, the mutual engagement of the two shafts 6A and 6B makes use of a tubular endpiece 23 which is constrained to rotate with the shaft 6A and an inside cylindrical finger 24 secured to the shaft 6B. In addition, the first lever 17 is secured to the endpiece 23 and the second lever 18, 19 to the finger 24.

More precisely, the tubular length 25 which may eventually be tilted into a U-shape as shown to make it easier to install, is engaged at both ends on cylindrical fingers terminating the two shafts 6A and 6B and it is secured by welding to one of those two fingers only, namely the finger on the shaft 6B in FIG. 1 and the finger on the shaft 6A in FIG. 4.

As a result, and whichever embodiment is adopted, a hinge is obtained for a vehicle seat back whose structure, operation, and advantages can be seen sufficiently clearly from the above.

Naturally, and as can also be seen from the above, the invention is not limited in any way to those applications and embodiments that are more particularly described; on the contrary, it extends to all variants, and in particular those in which the end of the cable 20 that is further from the lever 18 is secured to the latch 11 not directly but via a part connected to the latch, such as the rod 14 or even the knob M.

We claim:

1. A vehicle front seat including a seat proper and a back mounted on the seat proper by means of a hinge device making it possible firstly to adjust inclination of the back finely to a normal angular sitting position and secondly to tilt the back down forwards with the possibility of subsequently returning to the preadjusted normal angular sitting position, the device comprising:

an angular locking mechanism for locking the back comprising a moving latch, a base secured to the seat proper and having a notch for receiving the latch, and a return spring for continuously urging the latch towards the notch;

a control member mounted on the back for causing the latch to be disengaged from the notch against the return force of the corresponding return spring;

on both sides of the seat, a respective adjustment mechanism for discontinuous adjustment of the inclination of the back, each mechanism comprising a first cheekplate connected to the seat proper and provided with a ring guiding one or more slugs, a second cheekplate provided with an internally toothed ring, the second cheekplate being secured to the base of the locking mechanism, a cam mounted to rotate about the common axis of the two rings, at least one toothed slug mounted so as to be capable of sliding radially in the first cheekplate and cooperating with the cam and with the toothed ring, and a return spring urging the cam towards an angular locking position where the cam pushes the slug in engagement with the toothed ring; and a rotary control member easily actuated by a user sitting on the seat and suitable for causing the cams of both adjustment mechanisms to rotate simultaneously, the two adjustment mechanisms being connected together by a control shaft comprising first and second colinear lengths movable angularly relative to each other, the two colinear lengths being secured to the two respective cams and to two radial levers bearing angularly against each other in one direction only, and comprising a first lever secured to the first colinear lengths said first lever and first colinear length being on the same side as the locking mechanism, and a second lever secured to the second colinear length, an off-center point on the second lever being connected to the latch of the locking mechanism by a cable, the hinge device being organized in such a manner that:

actuating the handle in a direction for unlocking the adjustment mechanism whose cam is secured to the handle causes unlocking of the other adjustment mechanism by angular thrust of the first lever against the second lever, return of the handle to its original position giving rise automatically to return of both mechanisms to their locking positions because of the resilient return means associated with the cams of the two mechanisms; and actuating the knob in a direction for disengaging the latch from its notch causes the second lever to rotate in the direction corresponding to unlocking the second adjustment mechanism, release of the knob giving rise firstly to resilient return of the latch into the notch as soon as the angular positions of the latch and of the notch coincide again, and secondly to return of the second adjustment mechanism into a locking position because of the resilient angular return of the cam in said mechanism to an initial position.

2. A seat according to claim 1, wherein the two colinear lengths comprise respective endpieces engaged one in the other to allow mutual angular sliding.

3. A seat according to claim 1, wherein a connection zone between the two colinear lengths is axially disposed in an immediate vicinity of the adjustment mechanism whose cam is secured to the handle.

4. A seat according to claim 1, wherein the first lever comprises a plate tapering towards its end further from the axis of the shaft, and the second lever comprises an elongate plate extending diametrically on either side of the axis, the plate having one end connected to a cable and the other end extended by a tab extending at 90° thereto and coming into angular abutment against the first lever.

5. A seat according to claim 1, wherein the cable is connected to the second lever via a spring.

* * * * *